United States Patent
Jin et al.

(10) Patent No.: US 12,306,848 B2
(45) Date of Patent: May 20, 2025

(54) DATA FUSION SYSTEM AND DATA FUSION METHOD

(71) Applicants: DIGIWIN CO., LTD., Shanghai (CN); DATA SYSTEMS CO., LTD., New Taipei (TW)

(72) Inventors: Xu Jin, Shanghai (CN); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 0 days.

(21) Appl. No.: 18/389,829

(22) Filed: Dec. 20, 2023

(65) Prior Publication Data
US 2025/0053569 A1    Feb. 13, 2025

(30) Foreign Application Priority Data
Aug. 10, 2023 (CN) .......... 202311008879.X

(51) Int. Cl.
G06F 16/25 (2019.01)
G06F 16/23 (2019.01)
G06F 18/25 (2023.01)

(52) U.S. Cl.
CPC ........ G06F 16/254 (2019.01); G06F 16/2365 (2019.01); G06F 18/253 (2023.01)

(58) Field of Classification Search
CPC .......... G06F 16/254; G06F 16/2365
See application file for complete search history.

(56) References Cited

U.S. PATENT DOCUMENTS 11,836,637 B2 * 12/2023 Liu .......... G06N 5/022

* cited by examiner

Primary Examiner — Baoquoc N To
(74) Attorney, Agent, or Firm — JCIPRNET

(57) ABSTRACT

A data fusion system and a data fusion method that may effectively reduce redundancy and complexity after data amplification. The data fusion system includes a storage device and a processor. The storage device is configured to store a feature extraction module, a model building module, a model disassembly module and a data fusion module. The processor is electrically connected to the storage device. The processor is configured to execute the feature extraction module, the model building module, the model disassembly module and the data fusion module, and is configured to receive multiple form data. The feature extraction module extracts multiple feature data from the form data. The model building module performs a preprocessing operation on the feature data, and builds a prediction model. The model disassembly module disassembles the prediction model into multiple triples data. The data fusion module fuses the triples data into knowledge graph data.

18 Claims, 5 Drawing Sheets

DATA FUSION SYSTEM AND DATA FUSION METHOD

CROSS-REFERENCE TO RELATED APPLICATION

This application claims the priority benefit of China application serial no. 202311008879.X, filed on Aug. 10, 2023. The entirety of the above-mentioned patent application is hereby incorporated by reference herein and made a part of this specification.

BACKGROUND

Technical Field

The disclosure relates to a data processing technology, in particular to a data fusion system and a data fusion method.

Description of Related Art

A current enterprise resource planning (ERP) system may automatically predict business data by using a pre-built prediction model, and the prediction model may be built based on relevant historical business data and/or relevant historical information. However, due to the large amount of relevant historical business data and/or relevant historical information and the possibility of a large amount of redundant data, the complexity of the prediction model may also increase, resulting in poor system operation efficiency and poor prediction accuracy and/or the system consuming too much computing resources.

SUMMARY

The disclosure relates to a data fusion system and a data fusion method, which may effectively reduce the redundancy and complexity after data amplification.

According to an embodiment of the disclosure, the data fusion system of the disclosure includes a storage device and a processor. The storage device is configured to store a feature extraction module, a model building module, a model disassembly module and a data fusion module. The processor is electrically connected to the storage device, is configured to execute the feature extraction module, the model building module, the model disassembly module and the data fusion module, and is configured to receive multiple pieces of form data. The feature extraction module extracts multiple pieces of feature data from the pieces of form data. The model building module performs a preprocessing operation on the pieces of feature data, and builds a prediction model. The model disassembly module disassembles the prediction model into multiple pieces of triples data. The data fusion module fuses the pieces of triples data into knowledge graph data.

According to an embodiment of the disclosure, the data fusion method of the disclosure includes the following steps: a feature extraction module is executed by a processor to extract multiple pieces of feature data from multiple pieces of form data; a model building module is executed by the processor to perform a preprocessing operation on the pieces of feature data and build a prediction model; a model disassembly module is executed by the processor to disassemble the prediction model into multiple pieces of triples data; and a data fusion module is executed by the processor to fuse the pieces of triples data into knowledge graph data.

Based on the above, the data fusion system and the data fusion method of the disclosure may convert form data into feature data to build a prediction model, and may fuse data of the prediction model into knowledge graph data executed by the system, so as to effectively reduce the redundancy and complexity after data amplification, and further enable the system to realize effective business prediction functions according to the knowledge graph data.

In order to make the above-mentioned features and advantages of the disclosure comprehensible, embodiments accompanied with drawings are described in detail as follows.

DESCRIPTION OF THE EMBODIMENTS

Figure 1:
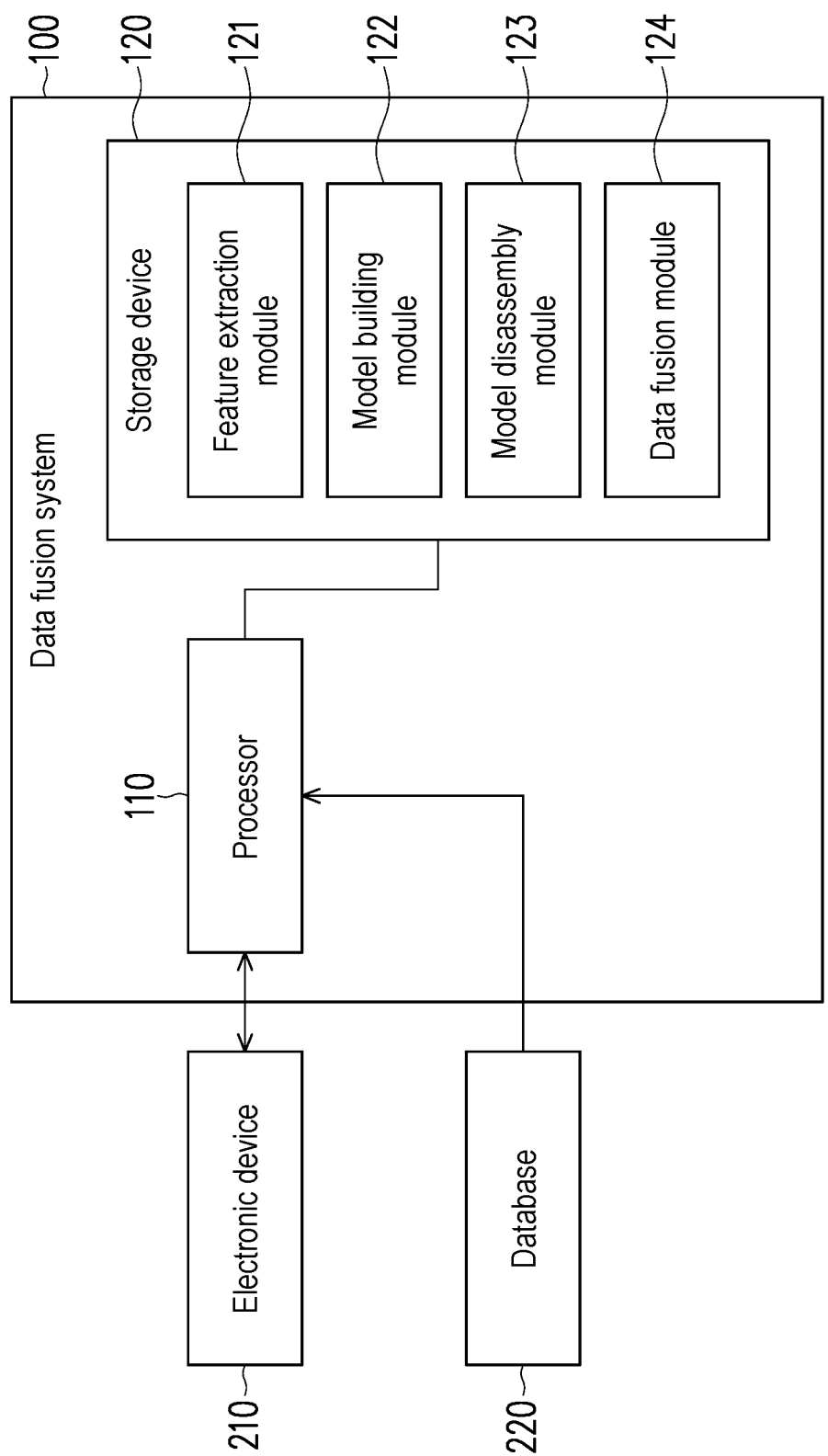
FIG. 1 is a schematic diagram of a data fusion system according to an embodiment of the disclosure.

Reference is now made in detail to exemplary embodiments of the disclosure, and examples of the exemplary embodiments are illustrated in the accompanying drawings. Wherever possible, the same reference numerals are used in the drawings and descriptions to refer to the same or similar parts.

FIG. 1 is a schematic diagram of a data fusion system according to an embodiment of the disclosure. Referring to FIG. 1, a data fusion system 100 includes a processor 110 and a storage device 120. The processor 110 is electrically connected to the storage device 120. The storage device 120 may store a feature extraction module 121, a model building module 122, a model disassembly module 123 and a data fusion module 124. In the embodiment, the data fusion system 100 may be realized by, for example, a cloud server to provide a software as a service function, or may be realized by a computer device, and the data fusion system 100 may communicate with an electronic device 210 and a database 220. In the embodiment, the processor 110 may obtain multiple pieces of form data and/or related business data from the database 220, and perform data processing on the pieces of form data and/or related business data, so as to be fused and amplified into knowledge graph data.

The electronic device 210 may be, for example, a user apparatus. The processor 110 may obtain input data (i.e., query data) from the electronic device 210, and may query the amplified knowledge graph data according to the input data, so as to feed back a corresponding prediction result to the electronic device 210. In the embodiment, the data fusion system 100 may be configured to realize abnormal replacement prediction of a supplier in the manufacturing industry, but the disclosure is not limited thereto.

In the embodiment, the processor 110 may be a system on a chip (SOC), or may include, for example, a central processing unit (CPU) or other programmable general purpose or special purpose microprocessors, digital signal processors (DSPs), programmable controllers, application specific integrated circuits (ASICs), programmable logic devices (PLDs), other similar processing devices, or combinations thereof. In the embodiment, the storage device 120 may be, for example, a dynamic random access memory (DRAM), a flash memory or a non-volatile random access memory (NVRAM) and the like. In the embodiment, the storage device 120 may be configured to store related data and related information described in various embodiments of the disclosure. The storage device 120 may be configured to store algorithms and programs of the feature extraction module 121, the model building module 122, the model disassembly module 123 and the data fusion module 124 for access and/or execution by the processor 110. The storage device 120 may further store or temporarily store relevant data and knowledge graphs required or generated by the data fusion system 100 during operation.

In the embodiment, the electronic device 210 may be, for example, a user computer or an input device (a device with a physical or virtual input port such as a keyboard, a mouse, or a touch interface). The database 220 may, for example, be configured to store related historical business data, historical business forms and/or related historical information related to an enterprise resource planning (ERP) system. In addition, it should be noted that the knowledge graph described in the various embodiments of the disclosure is a graph database configured to organize and represent knowledge. The graph database contains related business information and the relationships therebetween. A knowledge graph is a data structure configured to describe the association between real business data, so that the processor (computer) can perform automated logical reasoning based on the data structure.

Figure 2:
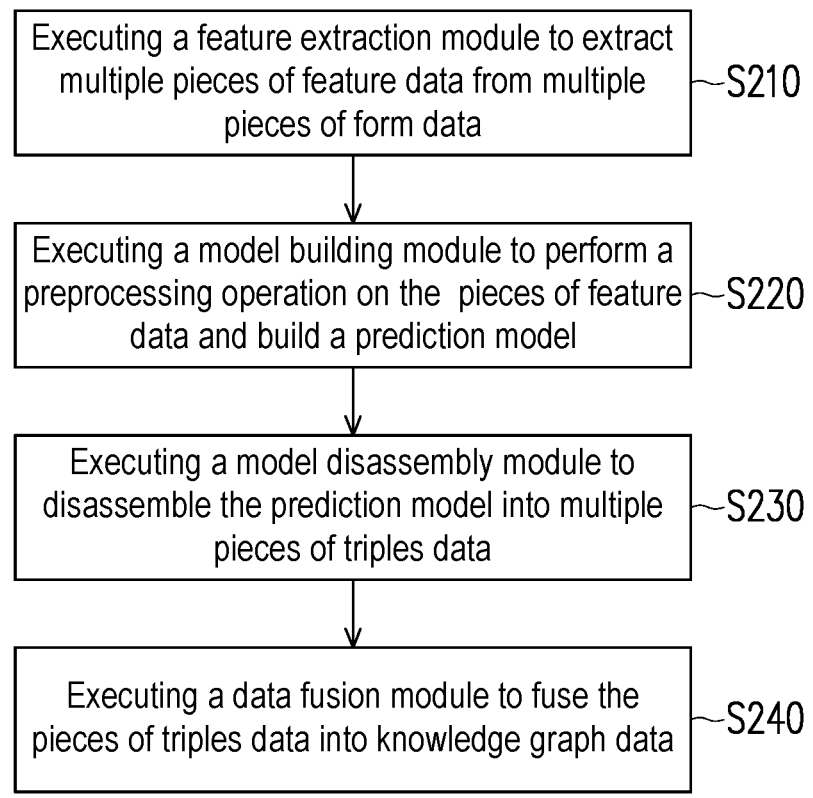
FIG. 2 is a flowchart of a data fusion method according to an embodiment of the disclosure.
Figure 3:
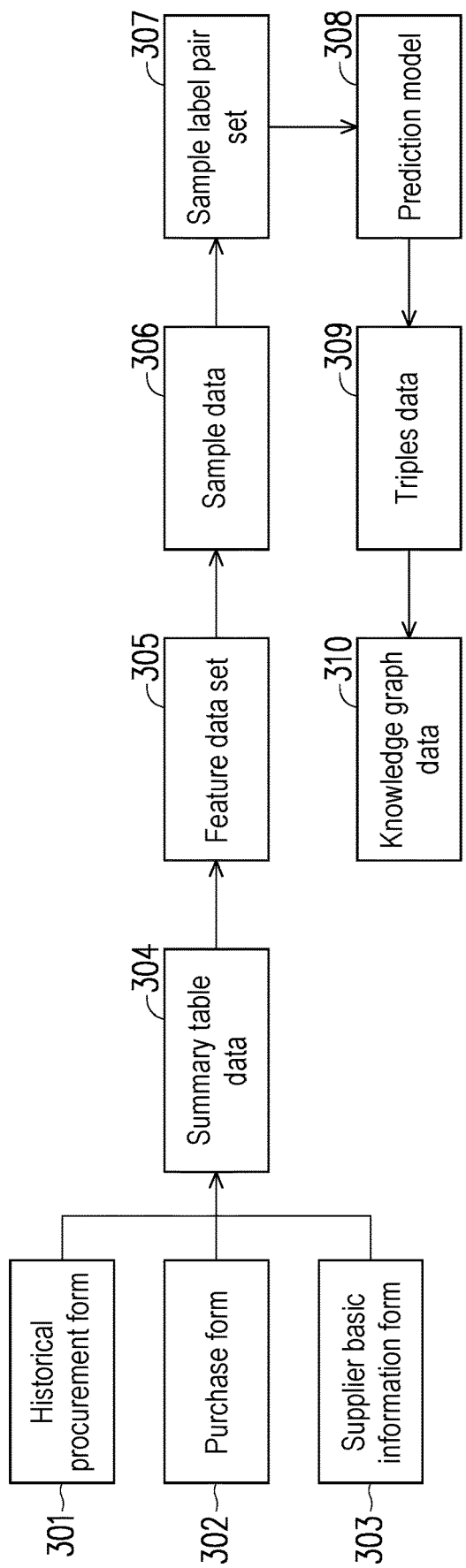
FIG. 3 is a schematic diagram of data conversion according to an embodiment of the disclosure.

FIG. 2 is a flowchart of a data fusion method according to an embodiment of the disclosure. FIG. 3 is a schematic diagram of data conversion according to an embodiment of the disclosure. Referring to FIGS. 1 to 3, the data fusion system 100 may execute the following steps S210 to S240. In step S210, the processor 110 may execute the feature extraction module 121 to extract multiple pieces of feature data from multiple pieces of form data. In the embodiment, the processor 110 may, for example, obtain multiple pieces of form data from a database, the pieces of form data may, for example, include at least one of a historical procurement form 301, a purchase form 302 and a supplier basic information form 303 as shown in FIG. 3. In the embodiment, the feature extraction module 121 may perform table association processing on the pieces of form data to generate summary table data 304, and perform an ETL (Extract, Transform, Load) engineering calculation on the summary table data to generate multiple pieces of feature data. The processor 110 may store the pieces of feature data as a data set 305 for use in subsequent modeling. Table association processing means that the feature extraction module 121 may associate the procurement form with the purchase form according to the table field procurement order class, procurement order number and serial number, and then use the table field manufacturer code to associate with the supplier basic information form.

In step S220, the processor 110 may execute the model building module 122 to perform a preprocessing operation on the pieces of feature data and build a prediction model. In the embodiment, the preprocessing operation includes performing data elimination and data filling on the pieces of feature data, selecting relevant features according to analysis of variance (ANOVA) to generate multiple pieces of sample data 306 and establishing a sample label pair set 307 according to the pieces of sample data 306. For example, the pieces of sample data 306 may be respectively configured to describe the number of days of delay. The model building module 122 may divide the pieces of sample data 306 according to whether the number of days of delay is within 7 days, and set the corresponding labels to 0 or 1 respectively. In the embodiment, the model building module 122 may build a prediction model 308 according to the sample label pair set 307 and based on a decision tree algorithm. In addition, data elimination refers to eliminating abnormal data. For example, if all the features of the data are null, it means that the data is abnormal and needs to be eliminated. Data filling refers to the fact that for part of features of some data, missing values exist and need to be filled. In this regard, the specific manner of data filling may be, for example, mean value filling, mode filling, or interpolation, which is not limited by the disclosure.

In step S230, the processor 110 may execute the model disassembly module 123 to disassemble the prediction model 308 into multiple pieces of triples data 309. In the embodiment, the prediction model 308 may be a tree structure, and each of node data of the tree structure includes information entropy, sample size information, class quantity information and class information. The triples data 309 may consist of factor data, condition data and conclusion data. Specifically, the factor refers to the set of all features on the path in the decision tree, the condition is the set of all determination conditions on the path and the conclusion is the prediction class of this path.

In step S240, the processor 110 may execute the data fusion module 124 to fuse the pieces of triples data 309 into knowledge graph data 310. In the embodiment, the data fusion module 124 may fuse the pieces of triples data 309 into the knowledge graph data 310 according to a set relationship between the respective factor data and condition data of the pieces of triples data 309 and according to a data size relationship between the respective conclusion data of the pieces of triples data 309. It should be noted that the data fusion module 124 may combine at least a part of the pieces of triples data and fuse thereof into the knowledge graph data 310.

In the embodiment, the processor 110 may receive input data from the electronic device 210, and the processor 110 may search the knowledge graph data 310 according to the input data to generate a prediction result. Taking the data fusion system 100 configured to realize abnormal replacement prediction of a supplier in the manufacturing industry as an example, the prediction result may include, for example, the number of delay days or the number of order delivery days.

Figure 4:
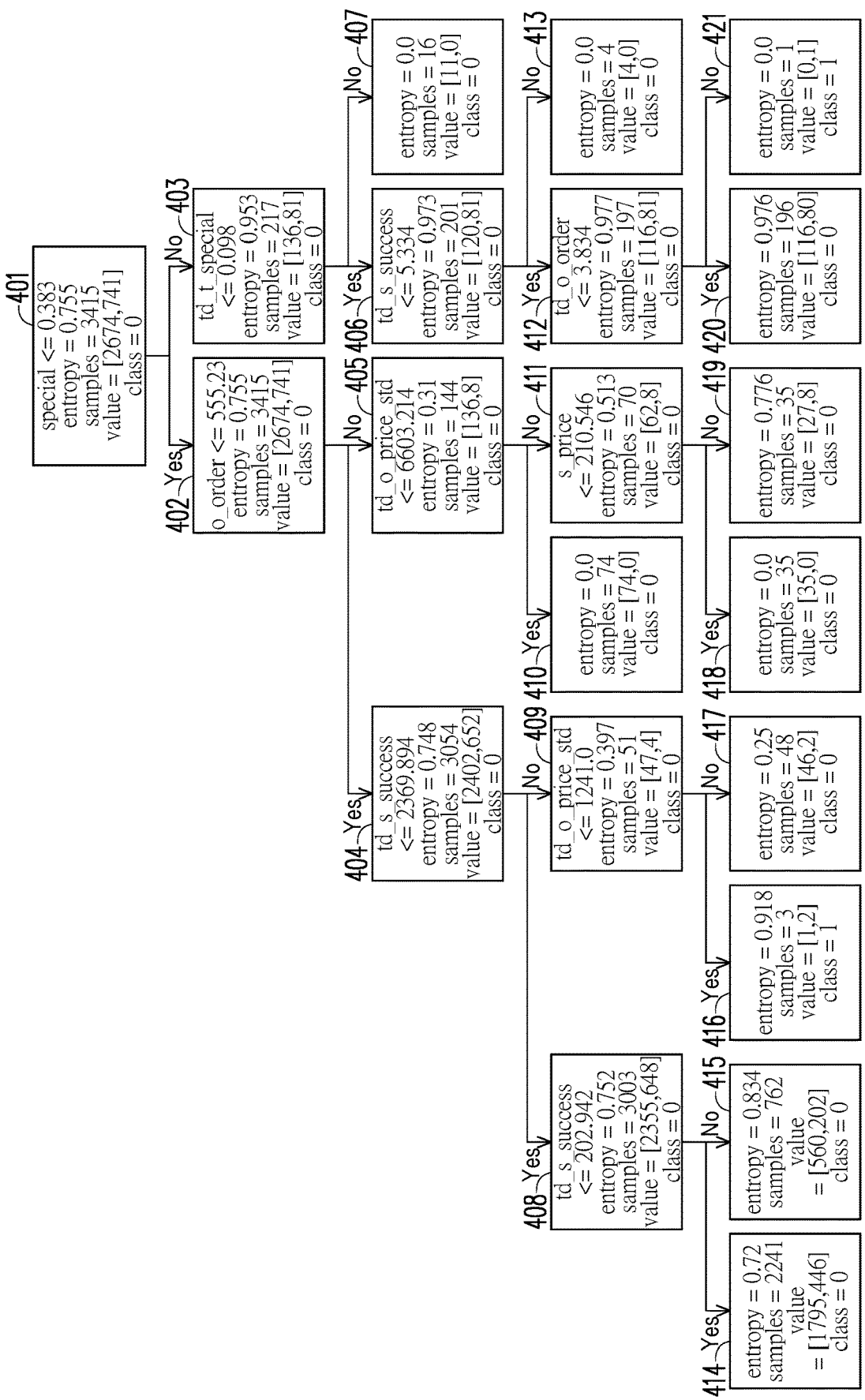
FIG. 4 is a schematic diagram of a prediction model according to an embodiment of the disclosure.

FIG. 4 is a schematic diagram of a prediction model according to an embodiment of the disclosure. Referring to FIGS. 1 and 4, the data structure of the prediction model described in the above embodiment may be shown in FIG. 4. FIG. 4 may be a data structure of a decision tree of a delivery delay prediction model for a certain year generated according to procurement data, and includes multiple nodes 401 to 421 corresponding to multiple decision features. In the embodiment, the node 401 may be a first-level node, and may include a conditional data index "special<=0.383" (that is, the division point of the feature special in the decision tree), information entropy "entropy=0.755" (configured to measure the purity of a sample set), sample size information "samples=3415" (referring to the number of samples in this set, that is, the total number of samples in the decision tree after a training set is divided according to a certain feature, such as the number of all samples of feature special<=0.383 in the training set), class quantity information "value=[2674, 741]" (referring to the number of positive and negative samples in this set, that is, the number of delayed and non-delayed samples) and class information "class=0" (class is the class label, and since the number of delayed samples 2674 in Value=[2674,741] is greater than the number of non-delayed samples 741, the class information is classified as delayed, and the class label thereof is 0). In this regard, if the condition is satisfied (Yes), the path points to the node 402. If the condition is not met (No), the path points to the node 403. The node 402 and the node 403 may be second-level nodes.

The node 402 may include a conditional data index "o_order<=555.23" (o_order refers to the number of orders in the last 1 month, which is a determination condition in the decision tree, and is configured to determine whether the number of orders in the last 1 month is less than or equal to 555.23), information entropy "entropy=0.735", sample size information "samples=3198", class quantity information "value=[2538,660]" and class information "class=0". In this regard, if the condition is satisfied (Yes), the path points to the node 404. If the condition is not met (No), the path points to the node 405. The node 403 may include a conditional data index "td_t_special<=0.098" (which is the determination condition in the decision tree, and is configured to determine the number of the feature special that is less than or equal to 0.098), information entropy "entropy=0.983", sample size information "samples=217", class quantity information "value=[136,81]" and class information "class=0". In this regard, if the condition is satisfied (Yes), the path points to the node 406. If the condition is not met (No), the path points to the node 407. The nodes 404 to 407 may be third-level nodes.

The node 404 may include a conditional data index "td_s_success<=2369.894" (td_s_success refers to the number of success times in the last 6 months, which is a determination condition in the decision tree, and may be configured to determine whether the number of success times in the last 6 months is less than or equal to 2369.894), information entropy "entropy=0.748", sample size information "samples=3054", class quantity information "value=[2402,652]" and class information "class=0". In this regard, if the condition is satisfied (Yes), the path points to the node 408. If the condition is not met (No), the path points to the node 409. The node 405 may include a conditional data index "td_o_price_std<=6603.214" (td_o_price_std refers to the standard deviation of the price in the last 1 month, which is a determination condition in the decision tree, and may be configured to determine whether the standard deviation of the price in the last 1 month is less than or equal to 6603.21), information entropy "entropy=0.31", sample size information "samples=114", class quantity information "value=[136,8]" and class information "class=0". In this regard, if the condition is satisfied (Yes), the path points to the node 410. If the condition is not met (No), the path points to the node 411. The node 406 may include a conditional data index "td_s_success<=5.334" (td_s_success refers to the number of success times in the last 6 months, which is a determination condition in the decision tree, and may be configured to determine whether the number of success times in the last 6 months is less than or equal to 5.334), information entropy "entropy=0.973", sample size information "samples=201", class quantity information "value=[120,81]" and class information "class=0". In this regard, if the condition is satisfied (Yes), the path points to the node 412. If the condition is not met (No), the path points to the node 413. The node 407 may be an end node, and includes information entropy "entropy=0.0", sample size information "samples=16", class quantity information "value=[16,0]" and class information "class=0". The nodes 408 to 413 may be fourth-level nodes.

The node 408 may include a conditional data index "td_s_success<=202.942" (td_s_success refers to the number of success times in the last 6 months, which is a determination condition in the decision tree, and may be configured to determine whether the number of success times in the last 6 months is less than or equal to 202.94), information entropy "entropy=0.752", sample size information "samples=3003", class quantity information "value=[2355,648]" and class information "class=0". In this regard, if the condition is satisfied (Yes), the path points to the node 414. If the condition is not met (No), the path points to the node 415. The node 409 may include a conditional data index "td_o_price_std<=1241.0" (td_o_price_std refers to the standard deviation of the price in the last 1 month, which is a determination condition in the decision tree, and may be configured to determine whether the standard deviation of the price in the last 1 month is less than or equal to 1241.0), information entropy "entropy=0.397", sample size information "samples=51", class quantity information "value=[47, 4]" and class information "class=0". In this regard, if the condition is satisfied (Yes), the path points to the node 416. If the condition is not met (No), the path points to the node 417. The node 410 may be an end node, and may include information entropy "entropy=0.0", sample size information "samples=74", class quantity information "value=[74,0]" and class information "class=0". The node 411 may include a conditional data index "s_price<=210.546" (s_price refers to the average price of the last 6 months, which is a determination condition in the decision tree, and may be configured to determine whether the average price of the last 6 months is less than or equal to 210.546), information entropy "entropy=0.513", sample size information "samples=70", class quantity information "value=[62,8]" and class information "class=0". In this regard, if the condition is satisfied (Yes), the path points to the node 418. If the condition is not met (No), the path points to the node 419. The node 412 may include a conditional data index "td_o_order<=3.834" (td_o_order refers to the number of orders in the last 1 month, which is a determination condition in the decision tree, and may be configured to determine whether the number of orders in the last 1 month is less than or equal to 3.834), information entropy "entropy=0.977", sample size information "samples=197", class quantity information "value=[116,81]" and class information "class=0". In this regard, if the condition is satisfied (Yes), the path points to the node 420. If the condition is not met (No), the path points to the node 421. The node 413 may be an end node, and may include information entropy "entropy=0.0", sample size information "samples=4", class quantity information "value=[4,0]" and class information "class=0". The nodes 414 to 421 may be fifth-level nodes.

The node 414 may be an end node, and may include information entropy "entropy=0.72", sample size information "samples=2241", class quantity information "value=[1795,446]" and class information "class=0". The node 415 may be an end node, and may include information entropy "entropy=0.834", sample size information "samples=762", class quantity information "value=[650,202]" and class information "class=0". The node 416 may be an end node, and, may include information entropy "entropy=0.918", sample size information "samples=3", class quantity information "value=[1,2]" and class information "class=1". The node 417 may be an end node, and may include information entropy "entropy=0.25", sample size information "samples=48", class quantity information "value=[46,2]" and class information "class=0". The node 418 may be an end node, and may include information entropy "entropy=0.0", sample size information "samples=35", class quantity information "value=[35,0]" and class information "class=0". The node 419 may be an end node, and may include information entropy "entropy=0.776", sample size information "samples=35", class quantity information "value=[27,8]" and class information "class=0". The node 420 may be an end node, and may include information entropy "entropy=0.976", sample size information "samples=196", class quantity information "value=[116, 80]" and class information "class=0". The node 421 may be an end node, and may include information entropy "entropy=0.0", sample size information "samples=1", class quantity information "value=[0,1]" and class information "class=1".

intersection set of different conditions is an empty set, and the absolute value of the difference of the respective corresponding probabilities of delay is less than a threshold of 0.25, for example, the probability values are all greater than 0.5, or less than or equal to 0.5.

As another example, two triples in Table 1 below may be fused into a new triple, and two triples in Table 2 below cannot be fused. In this regard, in Table 1, since the probabilities of the two triples are greater than 0.5, the two triples are determined to be in the same class, and conditions of the two triples can be combined. However, in Table 2, since one of the two triples has a probability greater than 0.5 and the other is less than 0.5, the two triples are determined not to belong to the same class and cannot be classified into one class. In this regard, the new triple in Table 1 is to be fused into the knowledge graph, and the two triples in Table 2 are to amplify the knowledge graph.

TABLE 1

| Triple 1 | ([special,o_order,td_s_success],[special<=0.383 and o_order<=555.23 and td_s_success<=2369.894 and td_s_success<=202.942],1795/2241=0.801) |
|---|---|
| Triple 2 | ([special,o_order,td_s_success],[special<=0.383 and o_order<=555.23 and td_s_success<=2369.894 and td_s_success>202.942],560/762=0.735) |
| Triple after fusion | ([special,o_order],[special<=0.383 and o_order<=555.23],0.768) |

TABLE 2

| Triple 3 | ([special,o_order,td_s_success],[special<=0.383 and o_order<=555.23 and td_s_success>2369.894 and td_o_order<=1241.0],1/3=0.333) |
|---|---|
| Triple 4 | ([special,o_order,td_s_success],[special<=0.383 and o_order<=555.23 and td_s_success>2369.894 and td_o_order>1241.0],46/48=0.96) |
| Unable to fuse | |

In the embodiment, the model building module 122 may divide the procurement data by year to build corresponding multiple prediction models, and the model disassembly module 123 may disassemble the prediction models to generate multiple pieces of triples data. In this regard, the data fusion module 124 may generate corresponding knowledge graphs according to the pieces of triples data, and may combine the graphs by year and perform fusion. For example, the data fusion system 100 may use the business data in 2011 to build a first knowledge graph, and use the business data in 2012 to build a second knowledge graph. The data fusion system 100 may fuse the first knowledge graph and the second knowledge graph by using a fusion rule to obtain a third knowledge graph, and then use the third knowledge graph and a fourth knowledge graph built from the next year's business data to further perform fusion. In this way, the prediction performance of knowledge graphs can continue to improve with the continuous fusion of knowledge graphs.

Figure 5:
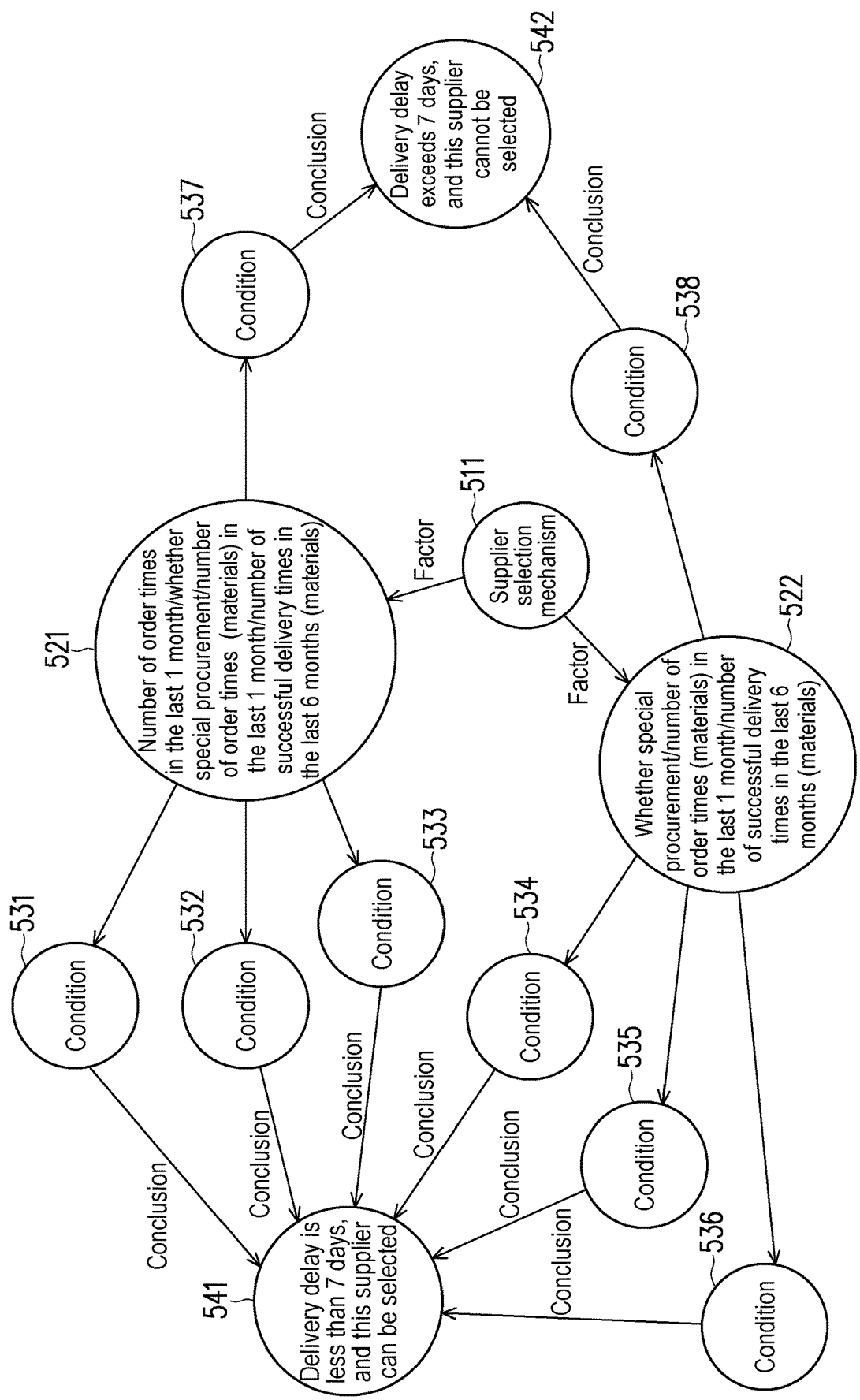
FIG. 5 is a schematic diagram of a knowledge graph according to an embodiment of the disclosure.

In the embodiment, the fusion of knowledge graphs is to fuse triples by using a fusion rule. The fusion rule fuse the pieces of triples data into the knowledge graph data mainly by the set relationship between the respective factor data and the condition data of the pieces of triples data, and according to the data size relationship between the respective conclusion data of the pieces of triples data. For example, the factor data of two pieces of triples data are consistent, and only one condition corresponding to all factors is different. The FIG. 5 is a schematic diagram of a knowledge graph according to an embodiment of the disclosure. Referring to FIGS. 1 and 5, the knowledge graph data of the disclosure may be as shown in FIG. 5, for example. In the embodiment, the knowledge graph in FIG. 5 may include nodes 511, 521 to 522, 531 to 538 and 541 to 542. The node 511 is configured to represent a supplier selection mechanism. The nodes 521 and 522 correspond to factor data. The node 521 is configured to represent "the number of order times in the last 1 month/whether special procurement/the number of order times (materials) in the last 1 month/the number of successful delivery times in the last 6 months (materials)". The node 522 is configured to represent "whether special procurement/the number of order times (materials) in the last 1 month/the number of successful delivery times in the last 6 months (materials)".

The nodes 531 to 538 correspond to condition data. The node 531 is configured to represent "whether special procurement<=0.383/the number of orders in the last 1 month<=555.23/the number of successful delivery times (materials) in the last 6 months". The node 532 is configured to represent "the number of orders in the last 1 month<=555.23/the number of successful delivery times (materials) in the last 6 months". The node 533 is configured to represent "whether special procurement<=0.383/the number of orders in the last 1 month>555.23". The node 534 is configured to represent "whether special procurement>0.383/the quantity of special procurement (materials)

>0.098 in the last 3 months". The node 535 is configured to represent "whether special procurement>0.383/the quantity of special procurement (materials) in the last 3 months<=0.098/the number of successful delivery times in the last 6 months". The node 536 is configured to represent "whether special procurement>0.383/the quantity of special procurement (materials) in the last 3 months<=0.098/the number of successful delivery times in the last 6 months". The node 537 is configured to represent "whether special procurement<=0.383/the number of orders in the last 1 month<=555.23/the number of successful delivery times (materials) in the last 6 months". The node 537 is configured to represent "whether special procurement>0.383/the quantity of special procurement in the last 3 months<=0.098/the number of successful delivery times (materials) in the last 6 months".

The nodes 541 to 542 correspond to conclusion data. The node 541 is configured to indicate "delivery delay is less than 7 days, and this supplier can be selected". The node 542 is configured to indicate "delivery delay exceeds 7 days, and this supplier cannot be selected".

In the embodiment, the data fusion system 100 may obtain input data (raw data) input by a user, and search the knowledge graph shown in FIG. 5 according to the input data, so as to realize delivery delay prediction. Specifically, the user may input the input data as shown in Table 3 below, and the input data in Table 3 includes multiple key-value pairs, in which the keys refer to features, and the values are the specific values under each of the features. In Table 3, "urgent" refers to whether urgent material procurement is required. "o_success" refers to the number of successful delivery times in the last 1 month. "o_order" refers to the number of orders in the last 1 month. "o_delivery" refers to the average delivery time in the last 1 month. "t_time" refers to the number of on-time times in the last three months. "t_order" refers to the number of order times in the last three months. "s_delivery" refers to the average delivery time in the last six months. "td_o_success" refers to the number of successful delivery times in the last 1 month. "td_t_success" refers to the number of successful delivery times in the last three months. "td_t_order" refers to the number of orders in the last three months. "td_t_delivery" refers to the average delivery time in the last three months. "td_s_success" refers to the number of successful delivery times in the last six months. The keys starting with "td" are the corresponding features generated according to the material situation.

In the embodiment, the data fusion system 100 may associate with the node 511 according to the input data, so as to run the supplier selection mechanism. Next, the data fusion system 100 may point to the node 521 or the node 522 corresponding to the factor according to the input data in Table 3 below, and may further select one of the nodes 531 to 538 corresponding to the condition. Lastly, the data fusion system 100 may point to the node 541 or the node 542 corresponding to the conclusion according to one of the nodes 531 to 538 to obtain a prediction result. In the embodiment, the prediction result may be displayed, for example, by the electronic device 210 operated by the user, the conclusion information as recorded in the node 541 or the node 542 (that is, the supplier can be selected or not). Alternatively, in an embodiment, the prediction result may further include displaying information such as the number of delay days or the number of order delivery days.

TABLE 3

| urgent | o_success | o_order | o_delivery | t_time | t_order |
|---|---|---|---|---|---|
| 0 | 9 | 9 | 3 | 27 | 36 |
| s_delivery | td_o_success | td_t_success | td_t_order | td_t_delivery | td_s_success |
| 9.875 | 9 | 36 | 36 | 1.75 | 72 |

As another example, it is supposed that a certain triple is: ([urgent,o_order,td_s_success], [urgent<=0.383 and o_order<=555.23 and td_s_success<=2369.894 and td_s_success<=202.942],0.801). If the values corresponding to the three features of "urgent", "o_order" and "td_s_succes" in certain data satisfy the condition part of the triple, the prediction result is that the delay probability is 0.801.

In summary, the data fusion system and the data fusion method of the disclosure may automatically build a prediction model according to the form data, and automatically fuse the data of the prediction model into the knowledge graph data executed by the system, so as to effectively reduce the redundancy and complexity of the amplified knowledge graph data, and further enable the system to realize effective business prediction functions according to the knowledge graph data.

Finally, it should be noted that the above embodiments are only used to illustrate the technical solutions of the disclosure, but not to limit the technical solutions of the disclosure. Although the disclosure has been described in detail with reference to the foregoing embodiments, those of ordinary skill in the art should understand that the technical solutions described in the foregoing embodiments may still be modified, or some or all of the technical features thereof may be equivalently replaced. However, these modifications or substitutions do not make the essence of the corresponding technical solutions deviate from the scope of the technical solutions of the embodiments of the disclosure.

What is claimed is:

1. A data fusion method, comprising:
   executing, by a processor, a feature extraction module to extract a plurality of feature data from a plurality of form data;
   executing, by the processor, a model building module to perform a preprocessing operation on the plurality of feature data and build a prediction model;
   executing, by the processor, a model disassembly module to disassemble the prediction model into a plurality of triples data; and
   executing, by the processor, a data fusion module to fuse the plurality of triples data into knowledge graph data,
   wherein extracting the plurality of feature data from the plurality of form data comprises:
      performing table association processing on the plurality of form data to generate summary table data; and
      performing an ETL (Extract, Transform, Load) engineering calculation on the summary table data to generate the plurality of feature data.

2. The data fusion method according to claim 1, wherein the plurality of form data comprises at least one of a historical procurement form, a purchase form and a supplier basic information form.

3. The data fusion method according to claim 1, wherein the preprocessing operation comprises:
performing data elimination and data filling on the plurality of feature data, and selecting relevant features according to analysis of variance to generate a plurality of sample data; and
establishing a sample label pair set according to the plurality of sample data.

4. The data fusion method according to claim 3, wherein building the prediction model comprises:
building the prediction model according to the sample label pair set and based on a decision tree algorithm.

5. The data fusion method according to claim 4, wherein the prediction model is a tree structure, and each of node data of the tree structure comprises information entropy, sample size information, class quantity information and class information.

6. The data fusion method according to claim 1, wherein the plurality of triples data are respectively composed of factor data, condition data and conclusion data.

7. The data fusion method according to claim 1, wherein the data fusion module fuses the plurality of triples data into the knowledge graph data according to a set relationship between individually the factor data and the condition data of the plurality of triples data and a data size relationship between individually the conclusion data of the plurality of triples data.

8. The data fusion method according to claim 7, wherein fusing the plurality of triples data into the knowledge graph data comprises:
combining at least a part of the plurality of triples data and fusing thereof into the knowledge graph data.

9. The data fusion method according to claim 1, further comprising:
receiving, by the processor, input data; and
searching, by the processor, the knowledge graph data according to the input data to generate a prediction result.

10. A data fusion system, comprising:
a storage device, configured to store a feature extraction module, a model building module, a model disassembly module and a data fusion module; and
a processor, electrically connected to the storage device, configured to execute the feature extraction module, the model building module, the model disassembly module and the data fusion module and configured to receive a plurality of form data,
wherein the feature extraction module extracts a plurality of feature data from the plurality of form data, and the model building module performs a preprocessing operation on the plurality of feature data and builds a prediction model,
wherein the model disassembly module disassembles the prediction model into a plurality of triples data, and the data fusion module fuses the plurality of triples data into knowledge graph data,
wherein the feature extraction module performs table association processing on the plurality of form data to generate summary table data, and performs an ETL (Extract, Transform, Load) engineering calculation on the summary table data to generate the plurality of feature data.

11. The data fusion system according to claim 10, wherein the plurality of form data comprises at least one of a historical procurement form, a purchase form and a supplier basic information form.

12. The data fusion system according to claim 10, wherein the preprocessing operation comprises performing data elimination and data filling on the plurality of feature data, selecting relevant features according to analysis of variance to generate a plurality of sample data and establishing a sample label pair set according to the plurality of sample data.

13. The data fusion system according to claim 12, wherein the model building module builds the prediction model according to the sample label pair set and based on a decision tree algorithm.

14. The data fusion system according to claim 13, wherein the prediction model is a tree structure, and each of node data of the tree structure comprises information entropy, sample size information, class quantity information and class information.

15. The data fusion system according to claim 10, wherein the plurality of triples data are respectively composed of factor data, condition data and conclusion data.

16. The data fusion system according to claim 10, wherein the data fusion module fuses the plurality of triples data into the knowledge graph data according to a set relationship between individually the factor data and the condition data of the plurality of triples data and a data size relationship between individually the conclusion data of the plurality of triples data.

17. The data fusion system according to claim 16, wherein the data fusion module combines at least a part of the plurality of triples data and fuses thereof into the knowledge graph data.

18. The data fusion system according to claim 10, wherein the processor receives input data, and the processor searches the knowledge graph data according to the input data to generate a prediction result.

* * * * *